Figure 1:
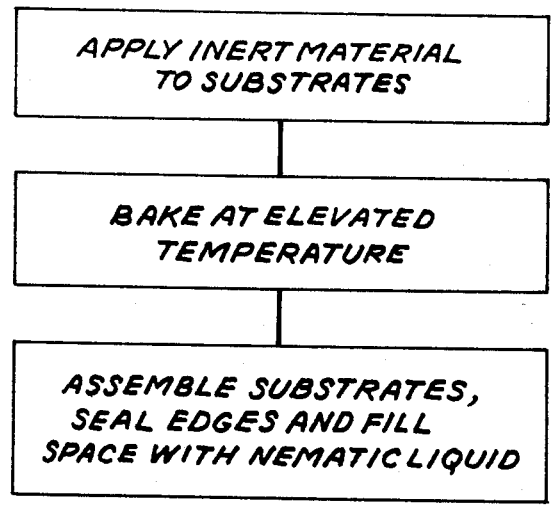

United States
Cole, Jr.

[11] 3,836,231
[45] Sept. 17, 1974

[54] UNIFORM LIQUID CRYSTAL CELLS AND METHOD FOR MAKING THE SAME

[75] Inventor: Herbert S. Cole, Jr., Scotia, N.Y.

[73] Assignee: General Electric Company, Schenectady, N.Y.

[22] Filed: Aug. 6, 1973

[21] Appl. No.: 385,830

Related U.S. Application Data

[63] Continuation of Ser. No. 185,209, Sept. 30, 1971, abandoned.

[52] U.S. Cl. .......................................... 350/160 LC
[51] Int. Cl. .............................................. G02f 3/00
[58] Field of Search ............................... 350/160 LC

[56] References Cited
UNITED STATES PATENTS
3,597,043  8/1971  Dreyer .............................. 350/149
3,694,053  9/1972  Kahn ................................. 350/150

OTHER PUBLICATIONS
Haller et al.: "Aligning Nematic Liquid Crystals," IBM Technical Disclosure Bulletin, vol. 13, pg. 3237, April, 1971.

Primary Examiner—Edward S. Bauer
Attorney, Agent, or Firm—Paul F. Wille; Joseph T. Cohen; Jerome C. Squillaro

[57] ABSTRACT

Liquid crystal displays with uniformly clear appearance and long lifetimes are described as comprising thin inert coatings applied to the surface of substrates which may include conductive layers thereon. The inert coatings advantageously are insoluble in the nematic liquid, adhere to the conductive layer and substrate and are substantially transparent. Suitable materials for the inert coating include vinyl acetate resins, ethylene-based resins, epoxies, anaerobic adhesives, polyimides and linear saturated polyesters, for example.

10 Claims, 2 Drawing Figures

PATENTED SEP 17 1974　　　　　　　　　　3,836,231

UNIFORM LIQUID CRYSTAL CELLS AND METHOD FOR MAKING THE SAME

This is a continuation, division, of application Ser. No. 185,209, filed Sept. 30, 1971, and now abandoned.

This invention relates to electro-optical display devices and more particularly to nematic liquid crystal light valves.

Liquid crystal display devices generally comprise two planar substrates with the adjacent parallel surfaces spaced less than approximately 4 mils apart. The adjacent surfaces of the substrates are provided with a substantially transparent conductive or semiconductive coating so that when the space between the parallel plates is filled with a nematic liquid, an electric field can be applied between the substrate and through the nematic liquid. With no voltage applied to the conductive coatings, a liqht source positioned off-axis (e.g., 45° off the orthogonal axis of the display) produces a uniform surface to a viewer. When a D.C. or A.C. field is applied to any portion of the nematic liquid, the nematic liquid exhibits a light scattering state which causes light from the source to produce a brighter area on the display which is readily observable by the human eye.

Numerous liquid crystal display devices and nematic liquids useful in the fabrication of such devices are well known to those skilled in the art. For example, U.S. Pat. No. 3,322,485 lists approximately 20 such materials. Still other compositions may also be employed if desired depending upon the requirements of the particular display device.

Liquid crystal display devices, however, are not without their problems. For example, many nematic liquid crystal display devices exhibit a hazy appearance which is undesirable, both from the observer's viewpoint and the manufacturer's viewpoint. The haziness is a result of random molecular order of the liquid crystal composition. Further, with prolonged operation, many undesirable characteristics become apparent. For example, the conductivity of the liquid crystal composition may increase, the liquid crystal material may become discolored or the useful temperature range may change. Additionally, the nematic liquid may lose its ability to switch from a substantially transparent condition to a light scattering condition and hence the display device becomes useless.

Accordingly, it is an object of the present invention to provide a nematic liquid crystal display device which is substantially transparent in an unactivated condition.

It is another object of the present invention to provide nematic liquid crystal display devices with substantially longer lifetimes.

It is still another object of this invention to provide uniformly clear liquid crystal display devices by a novel fabrication process.

Briefly, these and other objects of my invention are achieved in accord with one embodiment thereof by applying a thin substantially uniform coating of an inert material to the conductive and nonconductive surfaces of the substrate. The inert material also desirably exhibits adhesion characteristics to the substrate and further is insoluble in the liquid crystal material. Thin uniform coatings of inert materials of between approximately 20 Angstroms and up to approximately 2,000 A produce liquid crystal display devices with uniformly clear surfaces and exceptionally long lifetime without materially altering the threshold characteristics of the display device.

Figure 2:
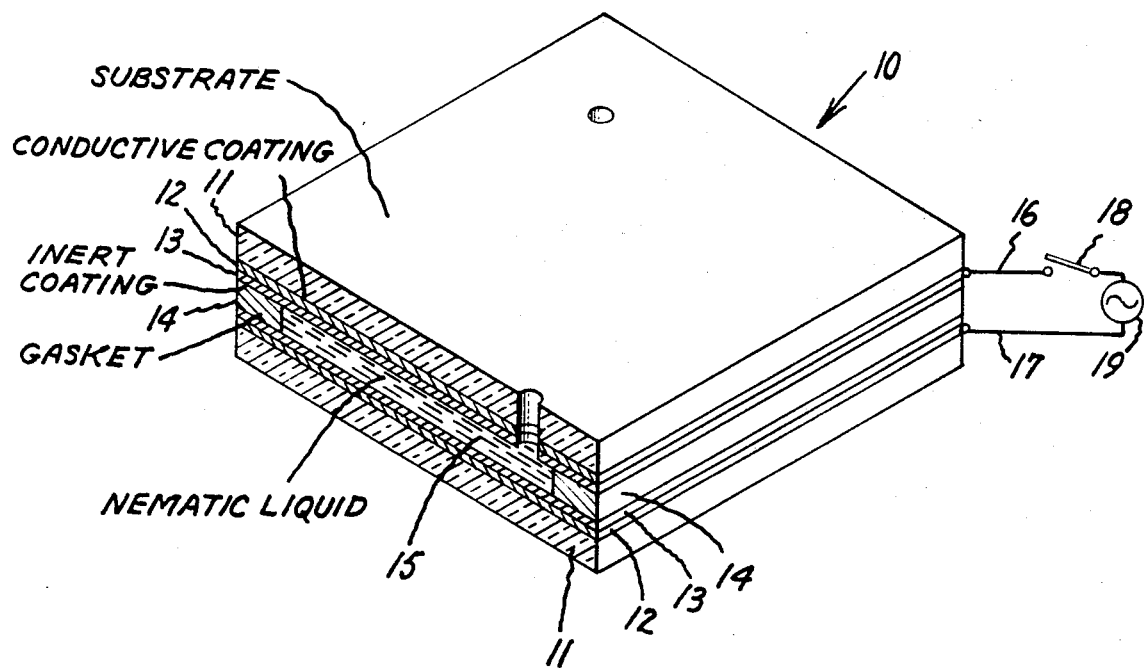

These and other objects and advantages of my invention will become more apparent to those skilled in the art from the following detailed description taken in connection with the accompanying drawing wherein:

FIG. 1 is a flow diagram of the steps of making a liquid crystal cell in accord with one embodiment of my invention; and FIG. 2 is a cross-sectional view of a liquid crystal display device fabricated in accord with my invention.

Liquid crystal display devices generally comprise glass substrates with a conductive coating formed thereon, such as tin oxide, indium oxide or copper sulfide, for example, so that the conductive layer does not materially alter the optical transparency of the glass. However, conductive coatings of aluminum or chromium, for example, are also useful where a highly reflective surface is desired. Hence, depending upon the requirements of the display device, either optically transmissive or reflective materials may be utilized. Methods for making such glasses are well known to those skilled in the art and require no further discussion herein.

Generally, two glass substrates with conductive coatings thereon are positioned in parallel relation with a gasket material along the periphery thereof so that a nematic liquid may be sealed therein. The application of either an A.C. or a D.C. voltage of sufficient magnitude to produce electrohydrodynamic instabilities in the nematic liquid causes the display device to switch from a substantially transparent mode to a light scattering mode. This phenomenon is more fully described by Kashnow and Cole in the Journal of Applied Physics, Volume 42, No. 5, of April 1971 at page 2134. Reference may be made thereto for a more thorough understanding, if desired. By utilizing this phenomenon in conjunction with suitably patterned conductive coatings, numerous display devices, such as alpha numeric displays and even advertising displays may be fabricated. Copending application Ser. No. 139,675 filed May 3, 1971 and of common assignee as the instant application describes such displays.

In accord with my invention, I have found that the application of a thin inert coating to the surface of the substrates which may include conductive or semiconductive regions thereon unexpectedly produce a uniformly clear liquid crystal display device and one exhibiting substantially longer lifetimes than those without such a coating. The primary requisites of the inert materials are insolubility in the liquid crystal material, adhesion to the substrate material with its conductive coatings thereon and a degree of transparency. Inert materials useful for the practice of my invention include such materials as vinyl acetate copolymers, ethylene-based resins, epoxies, anaerobic adhesives, polyimides and linear saturated polyester polymers, for example. Typical materials which meet these requirements and produce liquid crystal display devices with the aforementioned desirable characteristics include: (1) the 200-series ELVAX resins, trademark by E. I. duPont deNemours and Company. ELVAX 250, having a vinyl acetate concentration of between 27 and 29 percent of the total composition, is particularly useful. (2) VITEL resins, trademark by the Goodyear Tire and Rubber Company, identified by the No. PE-200. These resins are linear, saturated polyester polymers having molecular weights in the range of 20,000 to 30,000. (3) LOCTITE anaerobic adhesives, trademark of Loctite Corporation. These adhesives are single-component acrylic diesters which cure in the absence of air. LOCTITE adhesive No. 404 is particularly useful. (4) Epoxies, such as Crystal Clear Epoxy sold by Epoxy Coatings Company; and (5) Polyimides, such as those described in U.S. Pat. No. 3,448,068. Those skilled in the art can readily appreciate that the foregoing list of inert materials useful for the practice of my invention are merely illustrative. Other inert materials which satisfy the foregoing requirements of insolubility in the nematic liquid, adhesion to the substrates and high transparency may also be used if desired. Accordingly, my invention includes all useful inert materials.

FIG. 1 illustrates, by way of example, a method for applying an inert polymeric coating to a suitable substrate, such as a glass plate having a conductive coating thereon. The polymeric material may be applied in various ways. For example, a quantity of polymeric material, such as ELVAX-250, may be applied to the substrate from a solvent solution such as, for example, xylene containing 2 – 5 percent of ELVAX-250. Next, the substrate is placed on a rotating table to spin coat the polymeric material uniformly across the substrate. Alternately, the polymeric material may be wiped on the substrate with a cotton swab, if desired. The application of the polymeric material by the spinning method is preferred since it produces more nearly uniform coatings and the thickness of the coating is more readily controlled.

The thickness of the inert polymeric coating is preferably maintained within a range which provides a uniform coating but yet not so thick as to produce a substantial dielectric layer and hence increase the threshold voltage of the liquid crystal material. I have found that polymeric coatings as thin as approximately 20 A and as thick as 2,000 A produce exceptionally good results. Thickness greater than 2,000 A, however, causes the threshold voltage of the liquid crystal display device to increase. Generally, display devices with high threshold voltages are undesirable, however, those skilled in the art can readily appreciate that if a variable threshold liquid crystal device is desired, the thickness of the inert polymeric coating may be adjusted to produce this variable threshold device. Accordingly, within a range of thicknesses ranging between approximately 20 and 2,000 A, no perceptible difference in threshold voltage is produced; however, thicknesses greater than this range, such as, up to 10,000 A, may be employed where variable threshold devices are desired.

After applying the inert polymeric coating in a manner described above, for example, the substrate with its coating is baked at an elevated temperature of approximately 80° to 150°C for approximately 30 minutes to remove any residual solvent and where necessary, to effect hardening or curing. A liquid crystal display device is then assembled by positioning two substrates in substantially parallel relation with a gasket material therebetween so that the relative distance between the substrates is fixed. The gasket may comprise paper gasket material or other suitable non-contaminating or inert materials. Alternately, the display device may be sealed with a glass frit and the spacing between the plates determined in that manner. The space between the glass plates is then filled with any of the numerous liquid crystal materials, through a hole in the substrate such as those described in the aforementioned patent. Still other liquid crystal materials, may be used if desired and my invention is not limited to any specific liquid crystal material.

FIG. 2 illustrates a liquid crystal display device 10 with two substrates 11 with their conductive coatings 12 thereon. Inert coatings 13 are applied over the conductive coatings and gaskets 14 provide a peripheral seal for containing a liquid crystal material 15 between the substrates. Electrical connections are made to the conductive layers 12 by conductors 16 and 17. An electrical switch 18 and a voltage source 19 are serially connected with the conductors 16 and 17 to provide either a D.C. or an A.C. voltage to the conductive layers 12. In this way, an electric field may be impressed across the liquid crystal material and hence produce the desired display function from the liquid crystal display device.

Liquid crystal display devices constructed in accord with my invention offer numerous advantages over prior art nematic liquid crystal displays. For example, the inert protective coating greatly improves the clarity of the display by eliminating or at least substantially reducing the hazy appearance of the nematic liquid in its quiescent state. There is substantially less background scattering, hence the contrast of my displays are substantially higher than prior art displays. Tests on substantially identical displays but for the inert coating show contrast improvements of at least 60 percent over the uncoated displays. Yet another advantage of displays constructed in accord with my invention is the increased lifetime of the display with substantially constant conductivity characteristics. For example, displays operating continuously for over 2,000 hours have shown no perceptible change in conductivity, whereas displays without the inert coating have increased in conductivity by about 10 times over their original values.

In order that those skilled in the art may better appreciate my invention, the following examples are given by way of illustration and not by way of limitation.

EXAMPLE 1

A pair of transparent glass substrates having a conductive coating of tin oxide thereon are provided with an ELVAX-250 coating having a thickness of approximately 200 A. This coating is applied by spin-coating from a xylene solvent containing 3 per cent ELVAX-250. The substrate with its coating is baked in an oven for approximately 15 minutes at a temperature of approximately 140°C to remove residual solvent. The plates are then placed in parallel relation, about 15 microns spacing, and a suitable gasket provided along the periphery thereof and the space between the parallel plates is filled with a nematic liquid crystal, such as, N-(p-methoxybenxylidene)-p-butylaniline, having a nematic temperature range of 20° – 46°C.

The fabricated display device is substantially transparent in the unactivated condition and exhibits negligible light scattering as a result of ordering influence of the polymer coating. The application of a D.C. voltage of approximately 30 volts between the conductive coatings produces light scattering in the activated areas of the display device and produces a contrasting image with respect to the background or unactivated areas of the display device.

EXAMPLE 2

A display device similar to that described in Example 1 is fabricated in substantially the same manner but the inert polymeric material is VITEL PE-200. The thickness of this linear saturated polyester is 1,000 A and the resultant display device exhibits substantially the same characteristics as that described above in Example 1.

EXAMPLE 3

A display device similar to that described in Example 1 is fabricated with an inert coating of LOCTITE adhesive 404, an anaerobic adhesive. The thickness of this coating is approximately 500 A. The coated substrates are baked under vacuum for one-half hour at 140°C. The resulting display device functions in substantially the same manner described above in Example 1.

EXAMPLE 4

A display device similar to that described in Example 1 is fabricated with an inert coating of epoxy, applied with a soft cloth and rubber in a common direction to produce a uniformly thin layer of approximately 1,000 A. The coated substrates are baked for one-half hour at 150°C to cross-link the epoxy. The display device functions in substantially the same manner as described in Example 1.

EXAMPLE 5

A display device similar to that described in Example 1 is fabricated but one of the substrates has a reflective coating of chromium thereon instead of tin oxide. The display produces a contrasting image by reflected light on the surface.

EXAMPLE 6

A display device similar to that described in Example 1 is fabricated with an inert coating of benzophenone dianhydride and a dianhydride as described in U.S. Pat. No. 3,448,068. The inert coating is wiped on the substrates with a soft cloth in a uniformly thin layer of approximately 1,000 A. The coated substrates are baked for one-half hour at 150°C to heat harden. The display device functions in substantially the same manner as described in Example 1.

Although the above examples have shown various modifications and variations of my invention, it is obvious that other modifications and variations are possible and will be recognized by those skilled in the art. Therefore, the appended claims are intended to cover all such modifications and variations.

What I claim as new and desire to secure by Letters Patent of the United States is:

1. In a nematic liquid crystal display device having at least two substrates with conductive coatings thereon and in closely spaced parallel relation with a nematic liquid crystal material sealed between said substrates, the improvement including an inert polymeric coating overlying each of the adjacently-spaced surfaces of said substrate, said inert polymeric coating being insoluble in said nematic material and having a thickness of between approximately 20 and 10,000 Angstroms.

2. The improvement of claim 1 wherein said inert polymeric coating has a thickness of between approximately 20 and 2,000 A.

3. The improvement of claim 1 wherein said inert polymeric coating is a vinyl resin including 27 to 29 percent of vinyl acetate.

4. The improvement of claim 1 wherein said inert polymeric coating is a linear, saturated polyester polymer material.

5. The improvement of claim 1 wherein said inert polymeric coating is an anaerobic adhesive.

6. The improvement of claim 1 wherein said inert polymeric coating is a substantially clear epoxy.

7. A method for making a uniformly clear nematic liquid crystal display device, said method comprising the step of:

applying an inert polymeric coating to at least two substrates, each substrate having a conductive coating on at least a portion of said substrate;

placing said substrates in substantially parallel relation with a spacing of between approximately 5 and 100 microns therebetween; and sealing a nematic liquid crystal material in said space.

8. The method of claim 7 wherein said inert polymeric coating has a thickness of between approximately 20 and 2,000 A and is substantially insoluble in said liquid crystal material.

9. The method of claim 7 wherein said inert polymeric coating is applied by spin-coating from a solution.

10. The method of claim 7 wherein said inert polymeric coating is substantially transparent, substantially insoluble in the liquid crystal material and adheres to the substrate.

* * * * *